US012782991B2

(12) United States Patent
Londak et al.

(10) Patent No.: US 12,782,991 B2
(45) Date of Patent: Nov. 3, 2026

(54) ADAPTIVE POWER SUPPLY RIPPLE REJECTION ENHANCEMENT IN VOLTAGE REGULATORS

(71) Applicant: SEMICONDUCTOR COMPONENTS INDUSTRIES, LLC, Scottsdale, AZ (US)

(72) Inventors: Pavel Londak, Hutisko Solanec (CZ); Barbara Pankova Maludova, Frydek-Mistek (CZ); Jan Matej, Ostrava (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 206 days.

(21) Appl. No.: 18/631,915

(22) Filed: Apr. 10, 2024

(65) Prior Publication Data

US 2025/0321603 A1 Oct. 16, 2025

(51) Int. Cl.
*G05F 1/575* (2006.01)
*G05F 1/595* (2006.01)

(52) U.S. Cl.
CPC .............. *G05F 1/575* (2013.01); *G05F 1/595* (2013.01)

(58) Field of Classification Search
CPC ... G05F 1/10; G05F 1/267; G05F 1/46; G05F 1/561; G05F 1/567; G05F 1/569; G05F 1/571; G05F 1/573; G05F 1/5735; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595
See application file for complete search history.

(56) References Cited

U.S. PATENT DOCUMENTS

| | | | | |
|---|---|---|---|---|
| 6,541,946 | B1 | 4/2003 | Chen et al. | |
| 6,603,292 | B1 | 8/2003 | Schouten | |
| 7,804,284 | B1 | 9/2010 | Wong | |
| 7,843,180 | B1 | 11/2010 | Cilingiroglu | |
| 9,665,111 | B2 * | 5/2017 | Forejtek | G05F 1/575 |
| 10,345,839 | B1 | 7/2019 | Ogura | |
| 11,036,247 | B1 | 6/2021 | Wei | |
| 11,687,104 | B2 | 6/2023 | Koay et al. | |
| 11,761,603 | B2 | 9/2023 | Lu et al. | |

(Continued)

FOREIGN PATENT DOCUMENTS

DE 102015218648 A1 3/2017

*Primary Examiner* — Bryan R Perez
(74) *Attorney, Agent, or Firm* — Slayden Grubert Beard PLLC

(57) ABSTRACT

A regulator circuit includes a first stage, a second stage, and a boost circuit. The first stage includes a reference input and a feedback input, the feedback input configured to receive feedback from an output of the regulator circuit. The second stage is coupled to the first stage. The second stage includes an output transistor configured to drive the output of the regulator circuit. The boost circuit includes a first transistor configured to generate a bias current based on an output current of the output transistor. The boost circuit further includes a current-to-voltage converter configured to generate a bias voltage based on the bias current, and a capacitive element coupled between the current-to-voltage converter and a node of the first stage.

19 Claims, 6 Drawing Sheets

(56) References Cited

U.S. PATENT DOCUMENTS

| | | | | |
|---|---|---|---|---|
| 11,927,975 | B2 | 3/2024 | Voo | |
| 2007/0216382 | A1 | 9/2007 | Lin | |
| 2011/0121800 | A1* | 5/2011 | Drebinger | G05F 1/575 323/273 |
| 2018/0175813 | A1* | 6/2018 | Scott | H03F 1/3211 |
| 2019/0129458 | A1 | 5/2019 | Wang | |
| 2023/0055295 | A1 | 2/2023 | Heubi et al. | |
| 2023/0122789 | A1* | 4/2023 | Xiao | G05F 1/563 323/273 |
| 2023/0163727 | A1 | 5/2023 | Liu | |

* cited by examiner

ADAPTIVE POWER SUPPLY RIPPLE REJECTION ENHANCEMENT IN VOLTAGE REGULATORS

TECHNICAL FIELD

The disclosure relates generally to power supply ripple rejection in voltage regulators, and particularly to adaptive systems for enhancing power supply ripple rejection in low-dropout voltage regulators.

BACKGROUND

Voltage regulator circuits are circuits that are used to convert either a regulated or unregulated input voltage into a regulated output voltage that can be used to supply an electronic device. A low-dropout ("LDO") regulator (or LDO regulator) is a type of linear voltage regulator circuit that can provide a regulated output voltage even when there is only a small difference between the input voltage and the desired output voltage. LDO regulators may utilize an open-drain topology at the output of the LDO, where an output transistor can be driven into saturation thereby minimizing the voltage drop across the output transistor in instances where the desired output voltage is close to the input voltage.

One performance parameter for voltage regulator circuits, including LDO regulators, is the Power Supply Ripple Rejection ("PSRR"), also known as the Power Supply Rejection Ratio. The PSRR of a voltage regulator circuit describes the voltage regulator circuit's ability to suppress noise or other variations on the input voltage power supply from affecting the regulated output voltage of the voltage regulator circuit. The inventors of embodiments of the present disclosure have recognized that known techniques for improving PSRR may use large bias currents. As a result, the inventors of embodiments of the present disclosure have discovered that it may be difficult to improve PSRR without also negatively impacting quiescent current consumption. Embodiments of the present disclosure may address one or more of these challenges.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Details of one or more embodiments are set forth in the description below and the accompanying drawings. Other features will be apparent from the description, drawings, and from the claims.

Figure 1:
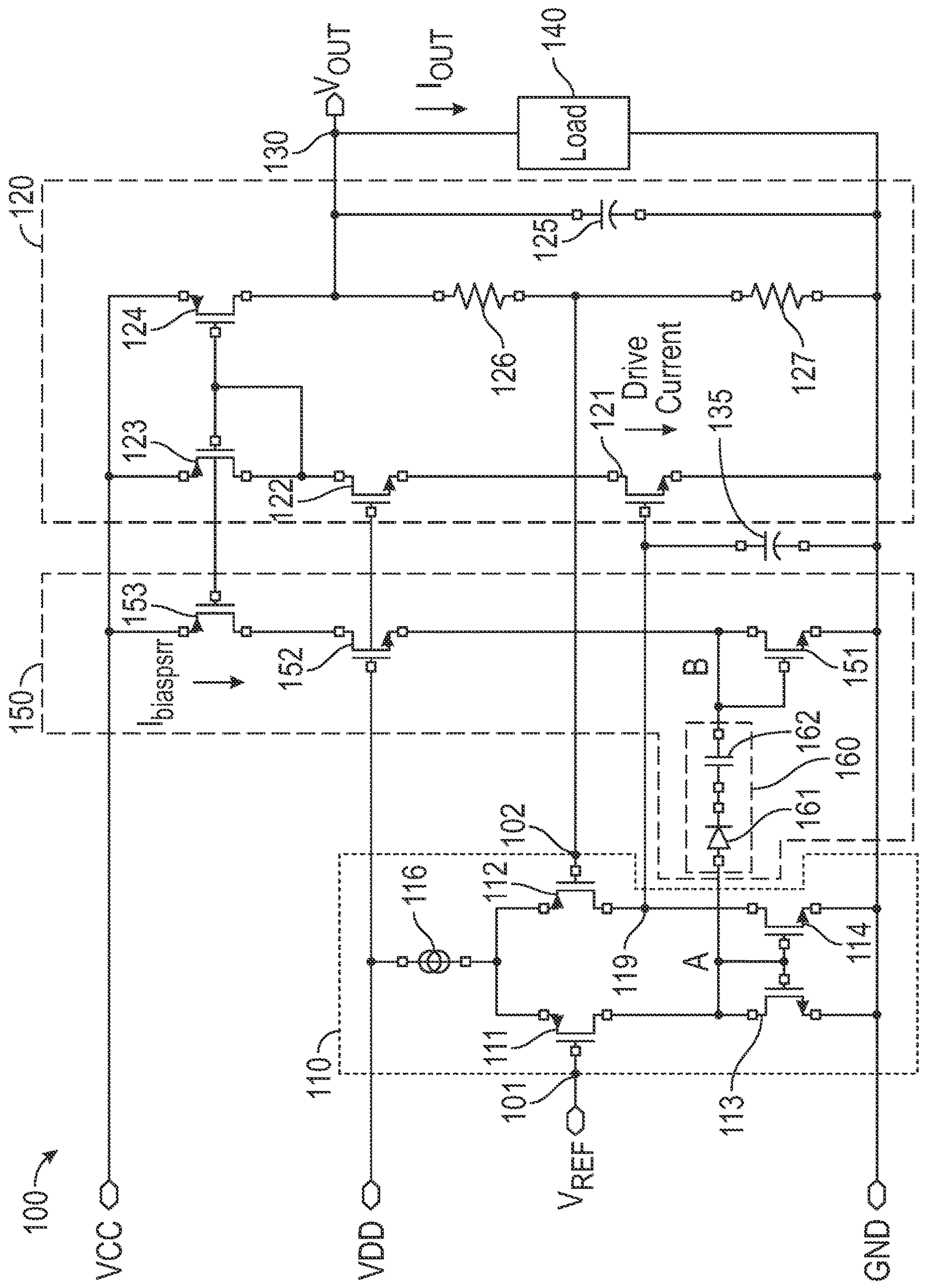
FIG. 1 illustrates a schematic diagram of an LDO regulator in accordance with example embodiments of the present disclosure.

FIG. 1 illustrates a schematic diagram of an LDO regulator 100 in accordance with example embodiments of the disclosure. LDO regulator 100 may include a first stage 110, a second stage 120, an output 130, a compensation circuit 135, and a PSRR boost circuit 150. LDO regulator 100 may receive a reference voltage $V_{REF}$, a first voltage supply VDD, and a second voltage supply VCC. LDO regulator 100 may provide a regulated output voltage $V_{OUT}$ at output 130 based on the reference voltage $V_{REF}$ and feedback from output 130. LDO regulator 100 may be configured to provide the regulated output voltage $V_{OUT}$ to an electronic device such as load 140. The output current $I_{OUT}$ provided by LDO regulator 100 may depend on the amount of current drawn by load 140. The amount of current drawn by load 140 may vary depending on the operating characteristics of the electronic circuitry forming load 140. For example, when the electronic circuitry forming load 140 is in a standby or non-operational mode, the load current may be 0 μA. Conversely, when the electronic circuitry forming load 140 is operating, load 140 may draw a load current above 0 μA, such as 5 μA, 1 mA, 10 mA, 100 mA, 1 A, or more.

First stage 110 may be implemented in any suitable fashion according to the operation described in the present disclosure. In some embodiments, first stage 110 may include reference input 101, feedback input 102, transistors 111 through 114, and current source 116. As shown in FIG. 1, the components of first stage 110 may be configured as a first amplifier stage. Transistors 111 and 112 may be P-channel metal-oxide-semiconductor field-effect transistors ("P-channel MOSFETs" or "PMOS" transistors). PMOS transistors 111 and 112 may be configured as a differential pair with their respective source terminals coupled together to collectively receive a bias current from current source 116. Current source 116 may be coupled to the first voltage supply VDD and may generate the bias current for first stage 110. The gate of transistor 111 may be coupled to reference input 101 to receive a reference voltage $V_{REF}$. The gate of transistor 112 may be coupled to feedback input 102 to receive a feedback voltage from the output of the LDO regulator 100. Accordingly, the differential pair formed by transistors 111 and 112 may compare and amplify any voltage difference between the reference voltage $V_{REF}$ at reference input 101 and the feedback voltage at feedback input 102.

As shown in FIG. 1, transistors 113 and 114 may be N-channel metal-oxide-semiconductor field-effect transistors ("N-channel MOSFETs" or "NMOS" transistors). The drain of NMOS transistor 113 may be coupled to the drain of PMOS transistor 111, and the drain of NMOS transistor 114 may be coupled to the drain of PMOS transistor 112. Further, the gates of NMOS transistor 113 and NMOS transistor 114 may be coupled to the drain of NMOS transistor 113 at node A, such that NMOS transistor 114 mirrors the current of NMOS transistor 113. Accordingly, components of first stage 110, including current source 116, PMOS transistors 111 and 112, and NMOS transistors 113 and 114, may collectively form a first amplifier stage with a first-stage output at node 119.

Second stage 120 may be implemented in any suitable fashion according to the operation described in the present disclosure. In some embodiments, second stage 120 may include NMOS transistor 121, NMOS transistor 122, PMOS transistor 123, and PMOS transistor 124. As shown in FIG. 1, the components of second stage 120 may be configured as a second amplifier stage with PMOS transistor 124 configured as an output transistor with an open-drain output that drives output 130 of LDO regulator 100. Second stage 120 may include a second-stage input that may be coupled the first-stage output of first stage 110. For example, as shown in FIG. 1, the gate of NMOS transistor 121 may be coupled to the first-stage output at node 119, and the source of NMOS transistor 121 may be coupled to ground GND. NMOS transistor 121 may thus generate a drive current based on the transconductance of NMOS transistor 121 and the gate-to-source voltage applied across node 119 and ground GND.

NMOS transistor 122 may be coupled to reside in the path of the drive current generated by NMOS transistor 121. As shown in FIG. 1, NMOS transistor 122 may have a gate coupled to VDD and a source coupled to the drain of NMOS transistor 121. Accordingly, NMOS transistor 122 may hold the bias voltage at the drain of NMOS transistor 121 at a level that is equal to VDD minus the gate-to-source voltage of NMOS transistor 122. VDD may be a low voltage supply at, for example, 1.8 V, 3.3 V, 5.0 V, or any other voltage suitable for low-voltage complementary metal-oxide-semiconductor ("CMOS") circuitry. In some embodiments, VCC may be any of a low voltage supply substantially equal to or greater than VDD; a medium-voltage supply at, for example, 24 V or up to 40 V; or a high-voltage supply above 40V, for example at 50 V, 60 V, 70 V, or more. In embodiments where VDD and VCC have the same voltage value, VDD and VCC may be implemented by a single voltage supply. VDD and VCC may be supplied by one or more voltage regulators located upstream from LDO regulator 100. Such upstream voltage regulators may be implemented with on-chip circuitry along with components of LDO regulator 100, or may be implemented with off-chip circuitry separate from a chip on which components of LDO regulator 100 may be implemented.

PMOS transistor 123 and PMOS transistor 124 may be configured to mirror the drive current that is generated by NMOS transistor 121, and passed through NMOS transistor 122, to provide an output current $I_{OUT}$ to load 140. The respective sources of PMOS transistor 123 and PMOS transistor 124 may be coupled to the second voltage supply VCC. The gates of PMOS transistors 123 and 124 may be coupled together and further to the drain of PMOS transistor 123. The drain of PMOS transistor 123 may also be coupled to the drain of NMOS transistor 122. Accordingly, the drive current generated by NMOS transistor 121 may pass through PMOS transistor 123 and may be mirrored by PMOS transistor 124 to provide output current $I_{OUT}$ to load 140. PMOS transistor 123 and PMOS transistor 124 may be sized at a ratio so that the drive current consumed by second stage 120 from the second voltage supply VCC is small relative to the output current $I_{OUT}$ provided to load 140. For the purposes of the present disclosure, the size of an individual NMOS or PMOS transistor may refer to the width-to-length ratio of the transistor's conduction channel, and the ratio of sizes between different transistors may refer to one transistor's width-to-length ratio relative to another transistor's width-to-length ratio. The ratio of the sizes of PMOS transistor 123 to PMOS transistor 124 may be, for example, 1:10, 1:100, 1:1000, or less, to scale the drive current needed to generate the output current Jour drawn by load 140 according to the same ratio. At times when the output current $I_{OUT}$ drawn by load 140 is zero, the bias current consumed by second stage 120 may likewise be zero, notwithstanding any nominal semiconductor leakage currents.

Second stage 120 may also include output capacitor 125, and feedback resistors 126 and 127. Output capacitor 125 may store charge at output 130 of LDO regulator 100. Output capacitor 125 may help maintain the regulated output voltage $V_{OUT}$ at the desired output voltage level as LDO regulator 100 responds to changes in output current $I_{OUT}$ demand from load 140.

Feedback resistors 126 and 127 may be coupled in series to form a resistor divider between output 130 and ground GND. Feedback resistors 126 and 127 may be sized to have large resistance values, for example, in the range of Kilo-Ohms, Mega-Ohms, or higher, such that the current drawn and consumed by feedback resistors 126 and 127 from PMOS transistor 124 is insubstantial relative to the output current $I_{OUT}$ drawn by load 140. The intermediate node between resistor 126 and resistor 127 may be coupled to feedback input 102 of first stage 110. Feedback resistors 126 and 127 may thus provide feedback representative of the output voltage $V_{OUT}$ to first stage 110. Based on the feedback, first stage 110 and second stage 120 may collectively regulate the output voltage $V_{OUT}$ to a level that is proportional to the reference voltage $V_{REF}$.

In some embodiments, output capacitor 125 and feedback resistors 126 and 127 may be implemented as part of second stage 120 as shown in FIG. 1. In other embodiments, output capacitor 125, feedback resistors 126 and 127, or any combination thereof may be implemented separately from second stage 120. For example, in some embodiments, transistors 121 through 124 of second stage 120 may be implemented as on-chip circuitry along with the components of first stage 110 and PSRR boost circuit 150, while output capacitor 125 and feedback resistors 126 and 127 are separately implemented with off-chip components. Moreover, the feedback of LDO regulator 100 may be implemented by feedback resistors, such as feedback resistors 126 and 127 shown in FIG. 1, or any other feedback network suitable to provide a feedback signal representative of the output voltage $V_{OUT}$ to feedback input 102.

LDO regulator 100 may also include compensation circuit 135. Compensation circuit 135 may be configured to compensate the frequency response of LDO regulator 100 and thereby ensure the stability of LDO regulator 100. In some embodiments, compensation circuit 135 may be implemented by a capacitor coupled between ground and the first-stage output at node 119. In other embodiments, compensation circuit 135 may be located at any suitable location within LDO regulator 100 and may comprise any suitable arrangement of components, such as capacitors and resistors, for ensuring the stability of the regulation loop. In some embodiments, compensation circuit 135 may be implemented with on-chip circuitry along with components of first stage 110, second stage 120, and PSRR boost circuit 150. In other embodiments, compensation circuit may be implemented with off-chip components separate from the first stage 110, second stage 120, or PSRR boost circuit 150.

As shown in FIG. 1, LDO regulator 100 may also include PSRR boost circuit 150. PSRR boost circuit 150 may be implemented in any suitable fashion according to the operation described in the present disclosure. In some embodiments, PSRR boost circuit 150 may include transistors 153, 152, 151, and capacitive element 160. Transistor 153 may be a PMOS transistor matching PMOS transistors 123 and 124. The source of PMOS transistor 153 may be coupled to VCC, and the gate of PMOS transistor 153 may be coupled to the gates of PMOS transistors 123 and 124. PMOS transistor 153 may thus mirror the drive current that passes through PMOS transistor 123 to generate a bias current $I_{biaspsrr}$ in a similar manner as PMOS transistor 124 mirrors the drive current to generate the output current $I_{OUT}$. The bias current $I_{biaspsrr}$ generated by PMOS transistor 153 for PSRR boost circuit 150 may thus be proportional to the output current $I_{OUT}$. In the present disclosure, descriptions of $I_{biaspsrr}$ may refer to the DC component of the current generated by PMOS transistor 124, unless otherwise describing both the DC component and the AC ripple of the current generated by PMOS transistor 124. Because PMOS transistor 153 mirrors the drive current to generate $I_{biaspsrr}$ in a similar manner as PMOS transistor 124 mirrors the drive current to generate the output current $I_{OUT}$, PMOS transistor 153 may also be referred to as generating $I_{biaspsrr}$ based on the output current $I_{OUT}$, or more specifically, as mirroring the output current $I_{OUT}$. In some embodiments, PMOS transistor 153 and PMOS transistor 124 may be sized at a ratio such that the bias current $I_{biaspsrr}$ consumed by PSRR boost circuit 150 is small relative to the output current $I_{OUT}$. The ratio of the sizes of PMOS transistor 153 to PMOS transistor 124 may be, for example, 1:10, 1:100, 1:1000, or smaller, to scale the bias current $I_{biaspsrr}$ relative to $I_{OUT}$ according to the same ratio.

As shown in FIG. 1, the bias current $I_{biaspsrr}$ may pass through NMOS transistor 152 and may be received by the drain of NMOS transistor 151 at node B of PSRR boost circuit 150. NMOS transistor 151 may be configured as a diode-connected transistor with the gate of NMOS transistor 151 coupled to the drain of NMOS transistor 151, and the source of NMOS transistor 151 coupled to ground GND. NMOS transistor 151 may thus serve as a current-to-voltage converter that generates a bias voltage at node B based on the bias current $I_{biaspsrr}$ received by NMOS transistor 151.

Capacitive element 160 may be coupled, for example, between node B of PSRR boost circuit 150 and node A of first stage 110. Capacitive element 160 may include diode 161 coupled in series with capacitor 162. Diode 161 may be arranged such that its cathode is pointed toward node B of PSRR boost circuit 150. For example, as shown in FIG. 1, diode 161 may have an anode coupled to node A of first stage 110, while capacitor 162 is coupled in series between the cathode of diode 161 and node B of PSRR boost circuit 150. In other examples, diode 161 may have a cathode coupled to node B of PSRR boost circuit 150 while capacitor 162 is coupled in series between the anode of diode 161 and node A of first stage 110. In other embodiments, capacitive element 160 may include any suitable number of instances of diode 161 and capacitor 162 arranged in series or in parallel to provide a suitable capacitive coupling between node B of PSRR boost circuit 150 and node A of first stage 110.

First stage 110 and PSRR boost circuit 150 may be configured such that diode 161 remains in either a reverse-bias operating region or a zero-bias operating region. For example, the DC operating point of node B depends on the size of NMOS transistor 151 as well as the bias current $I_{biaspsrr}$, which mirrors output current Jour. The size of NMOS transistor 151 and the ratio of $I_{biaspsrr}$ to $I_{OUT}$ may be configured such that the DC operating voltage at node B remains close to or above the DC operating voltage at node A of first stage 110, thus keeping diode 161 in either a zero-bias or a reverse-bias operating region.

Figure 2:
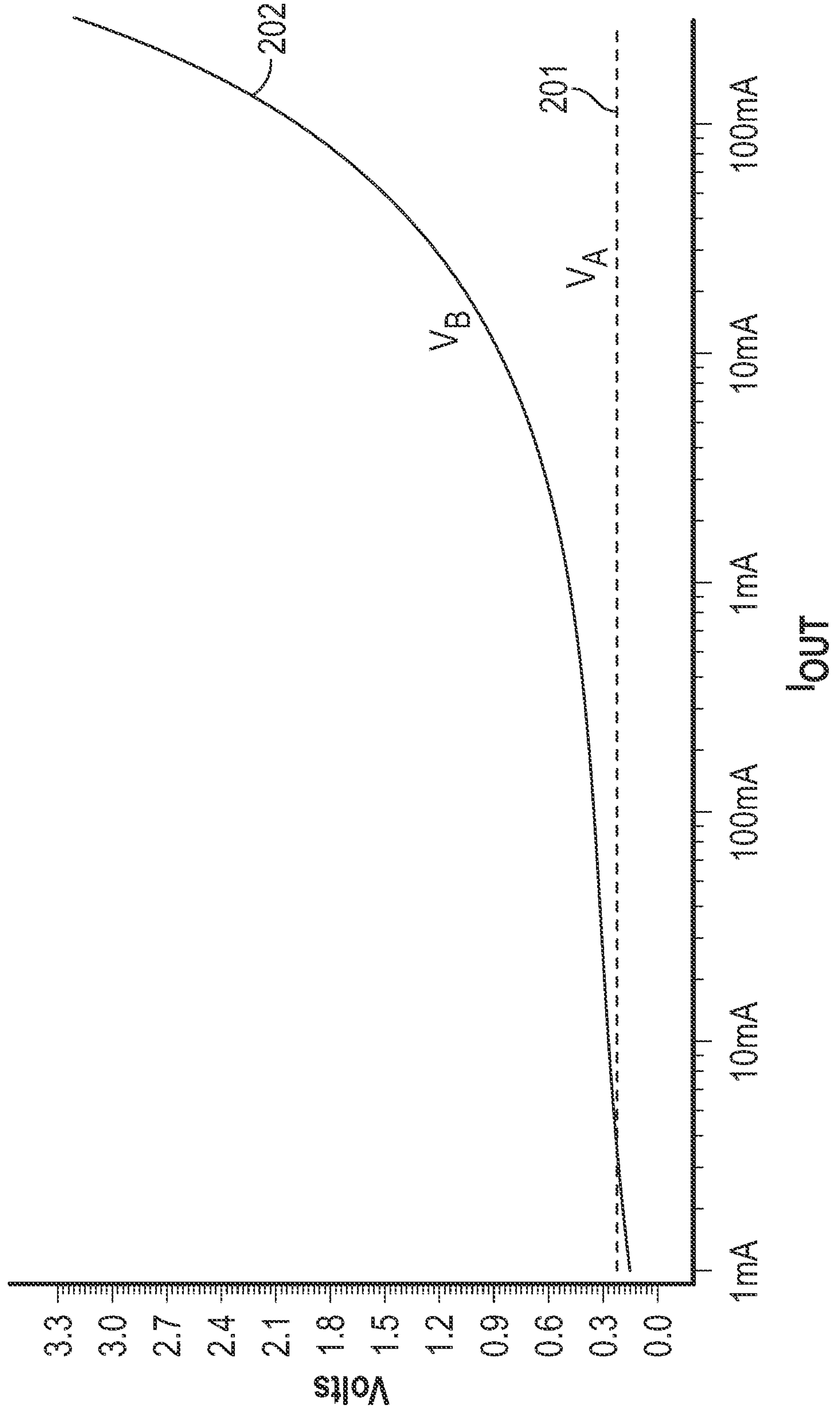
FIG. 2 illustrates a plot diagram of operating voltages within an LDO regulator in accordance with example embodiments of the present disclosure.

FIG. 2 illustrates an example plot diagram of the respective DC operating voltages of node A and node B within LDO regulator 100 in accordance with example embodiments of the present disclosure. Plot 201 illustrates the DC operating voltage of node A ("VA") of first stage 110 as a function of output current Jour. Plot 202 illustrates the DC operating voltage of node B ("VB") of PSRR boost circuit 150 as a function of output current $I_{OUT}$. As shown in FIG. 2, the DC operating voltage of node A may remain constant regardless of the output current $I_{OUT}$. On the other hand, the DC operating voltage of node B of PSRR boost circuit 150 may increase from voltages close to that of node A at nominal output currents, such as 1 μA, to voltages greater than that of node A as the output current $I_{OUT}$ increases. Thus, the relative voltages of the nodes of first stage 110 and PSRR boost circuit 150, between which capacitive element 160 is coupled, keeps diode 161 in either a zero-bias or a reverse-bias operating region.

Because diode 161 is kept in either a reverse-bias or a zero-bias operating region, diode 161 may function as a space charge area (depletion/barrier) capacitor. The capacitance $C_{160}$ of capacitive element 160 can be expressed as:

$$C_{160}=(C_{161}*C_{162})/(C_{161}+C_{162})$$

where $C_{161}$ is the capacitance of diode 161, and $C_{162}$ is the capacitance of capacitor 162.

Referring again to FIG. 1, PSRR boost circuit 150 may improve the PSRR of LDO regulator 100. PSRR boost circuit 150 provides compensation to offset unwanted changes to the output current $I_{OUT}$ and the output voltage $V_{OUT}$ caused by high-frequency AC ripple on VCC. As explained in detail below, PSRR boost circuit 150 may be configured to generate and inject compensation, into the regulation loop of LDO regulator 100, that is opposite in phase to the effect that the high-frequency AC ripple on VCC would otherwise have on the output current $I_{OUT}$ and output voltage $V_{OUT}$ of LDO regulator 100.

As described above with reference to FIG. 1, PMOS transistor 153 of PSRR boost circuit 150 may be configured to generate a bias current $I_{biaspsrr}$ that is proportional to the output current $I_{OUT}$. To the extent that a high-frequency AC ripple on VCC adds a high-frequency ripple component to $I_{OUT}$, that high-frequency AC ripple on VCC may similarly add a high-frequency AC ripple component to $I_{biaspsrr}$ at an amplitude that is proportional to the DC component of $I_{biaspsrr}$. As described above, NMOS transistor 151 may be configured as a diode-connected transistor and coupled to receive $I_{biaspsrr}$. NMOS transistor 151 may thus serve as a current-to-voltage converter that generates a voltage at node B based on $I_{biaspsrr}$. Accordingly, high-frequency AC ripple from VCC may be translated via $I_{biaspsrr}$ to the bias voltage at node B. Capacitive element 160 may capacitively couple node B of PSRR boost circuit 150 to node A of first stage 110. Capacitive element 160 may thus inject at least a portion of the high-frequency AC ripple present on node B of PSRR boost circuit 150 into node A of first stage 110.

The polarity of node A of first stage 110 may be opposite to the polarity of the output of LDO regulator 100. For example, in LDO regulator 100, the signal path from node A of first stage 110 to output 130 traverses three inversions, including across NMOS transistor 114, NMOS transistor 121, and PMOS transistor 124. Thus, the high-frequency AC ripple that originates from VCC, and that may be injected as a compensation signal into node A of first stage 110, may tend to offset and compensate against the effect that the high-frequency AC ripple from VCC has on the output current $I_{OUT}$ and the output voltage $V_{OUT}$ of LDO regulator 100.

Referring back to FIG. 1, diode 161 and capacitor 162 may be sized such that their capacitance does not substantially impact the gain or phase margin of LDO regulator 100 at unity gain. Diode 161 may be sized such that its nominal zero-bias capacitance may be, for example, 4 pF, 2 pF, 1 pF, or less. Similarly, capacitor 162 may be sized such that its capacitance may be, for example, 4 pF, 2 pF, 1 pF, or less. PSRR boost circuit 150 may thus improve the PSRR of regulator circuits, such as LDO regulator 100, without negatively impacting the operating bandwidth or the stability of the regulator circuit.

Figure 3A:
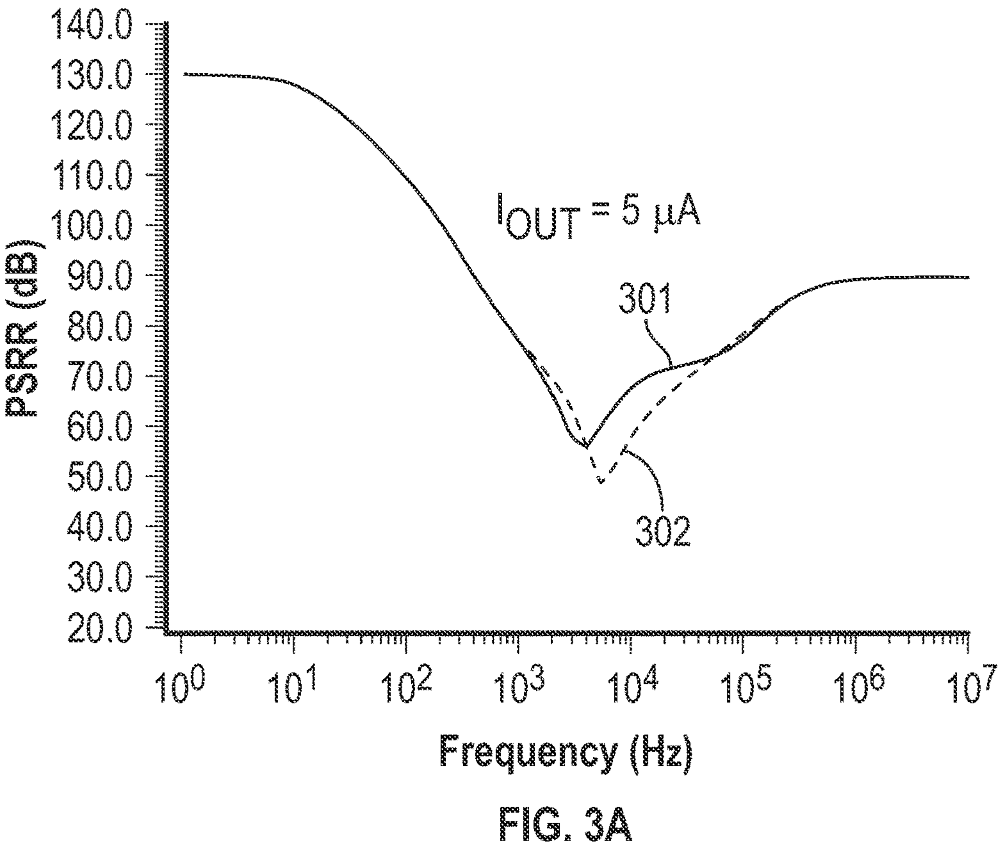
FIG. 3A illustrates a plot diagram showing improved PSRR for an LDO regulator in accordance with example embodiments of the present disclosure.
Figure 3B:
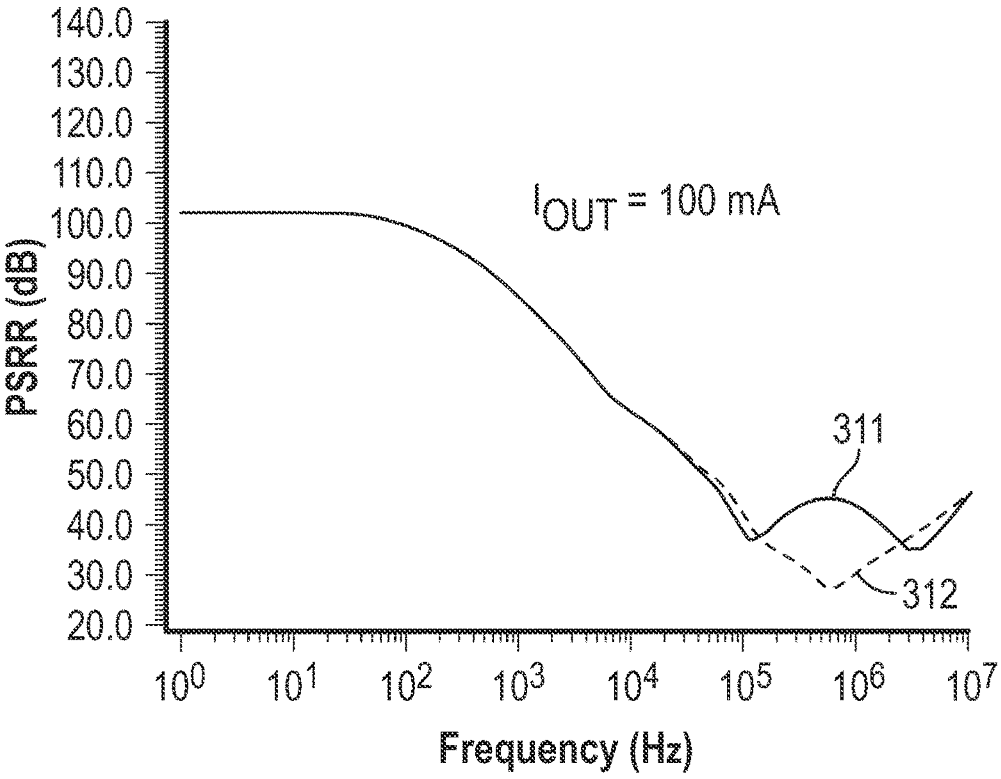
FIG. 3B illustrates a plot diagram showing improved PSRR for an LDO regulator in accordance with example embodiments of the present disclosure.

FIGS. 3A and 3B illustrate plot diagrams showing improved PSRR for an example LDO regulator in accordance with example embodiments of the present disclosure. PSRR boost circuit 150 may improve the PSRR in the frequency range above the unity gain bandwidth of the LDO regulator. FIG. 3A illustrates PSRR for an example LDO regulator that may have a unity gain bandwidth of approximately 3 kHz at an output current Jour of 5 μA. Plot 301 illustrates PSRR for the example LDO regulator with PSRR boost circuit 150, and plot 302 illustrates PSRR for the example LDO regulator without PSRR boost circuit 150. As shown in FIG. 3A, at an output current $I_{OUT}$ of 5 μA, PSRR boost circuit 150 may improve PSRR for frequencies ranging roughly from 4 kHz to 40 kHz. FIG. 3B illustrates PSRR for an example LDO regulator that may have a unity gain bandwidth of approximately 60 kHz at an output current Jour of 100 mA. Plot 311 illustrates PSRR for the example LDO regulator with PSRR boost circuit 150, and plot 312 illustrates PSRR for the example LDO regulator without PSRR boost circuit 150. As shown in FIG. 3B, at an output current Jour of 100 mA, PSRR boost circuit 150 may improve PSRR for frequencies ranging roughly from 100 kHz to 2 MHZ. As shown collectively in FIGS. 3A and 3B, the PSRR improvement techniques disclosed herein provide for an adaptive system, whereby the PSRR improvement provided by PSRR boost circuit 150 may be a function of both frequency and the output current $I_{OUT}$ of the regulator.

Embodiments of PSRR boost circuit 150 are described above as operating with LDO regulator 100, including first stage 110 and second stage 120. In other embodiments, PSRR boost circuit 150 may also be implemented to improve the PSRR of other types of regulator circuits or other types of LDO regulators. For example, PSRR boost circuit 150 may be implemented to improve the PSRR of regulator circuits that utilize any number and any type of amplifier stages suitable to provide a regulated output voltage at the output of the regulator circuit. In some embodiments, PSRR boost circuit 150 may generate a compensation signal based on the high-frequency ripple at VCC and inject the compensation signal into a node within the regulator circuit that is opposite in polarity to the output of the regulator circuit.

Features of PSRR boost circuit 150 may allow the maximum bias current $I_{biaspsrr}$ consumed by PSRR boost circuit 150 to be clamped at a maximum value. The maximum current consumed by PSRR boost circuit 150 from VCC may thus be advantageously limited.

Referring back to FIG. 1, PMOS transistor 153 of PSRR boost circuit 150 mirrors the drive current generated by NMOS transistor 121 in a similar manner as PMOS transistor 124. PMOS transistor 153 thus generates a bias current $I_{biaspsrr}$ for PSRR boost circuit 150 that may be proportional to the output current $I_{OUT}$. In some embodiments, NMOS transistor 152 may operate as a clamp or a clamp transistor that limits the maximum bias current $I_{biaspsrr}$. For example, as $I_{biaspsrr}$ increases proportionally with $I_{OUT}$, the voltage at node B increases. As shown in FIG. 1, node B is coupled to the source of NMOS transistor 152. The voltage at node B may thus be limited to a maximum of VDD minus the gate-to-source voltage of NMOS transistor 152.

Figure 4:
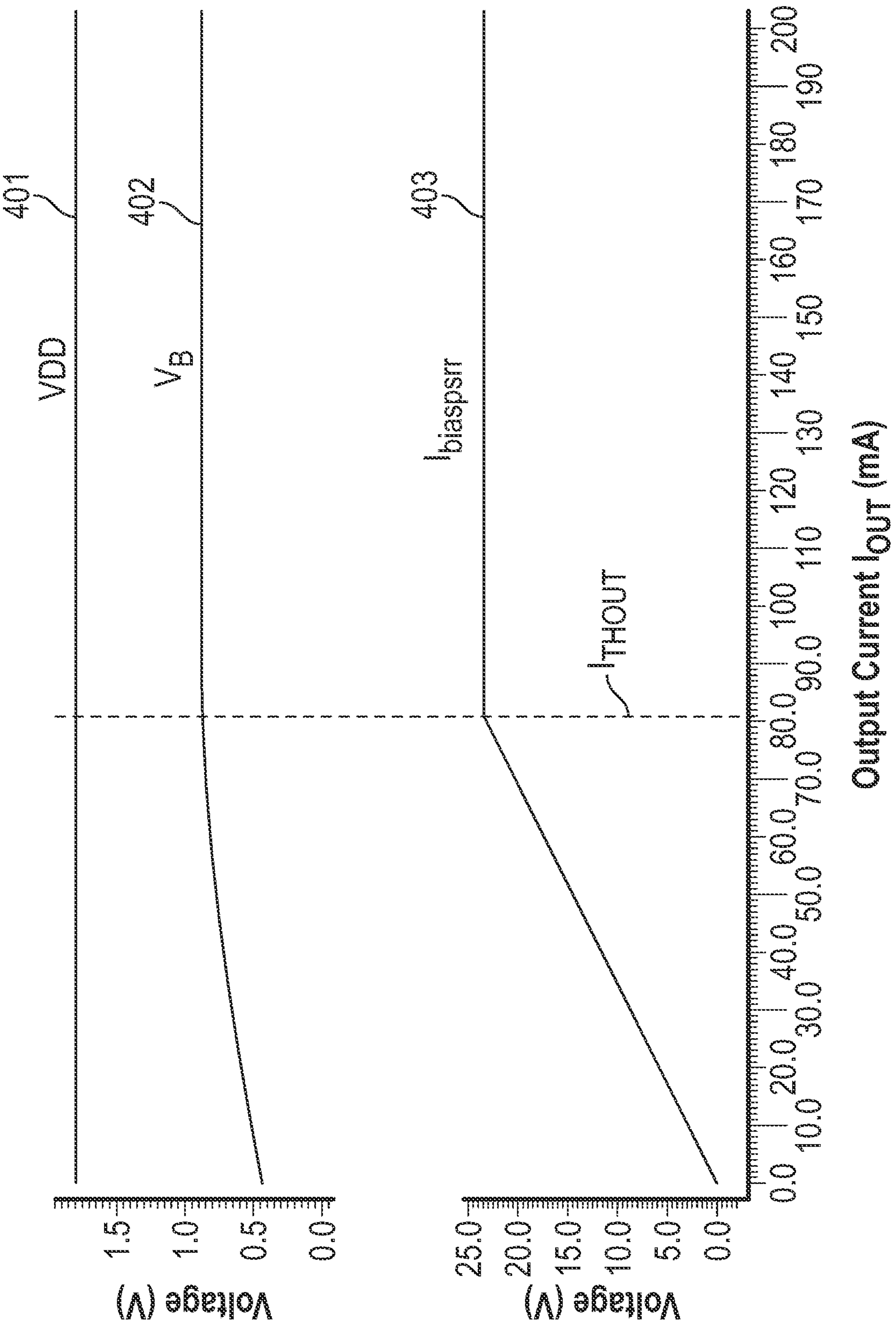
FIG. 4 illustrates a plot diagram showing a bias voltage and a bias current of a PSRR boost circuit as a function of the output current of an LDO regulator in accordance with example embodiments of the present disclosure.

FIG. 4 illustrates a plot diagram showing the bias voltage at node B and the bias current $I_{biaspsrr}$ of PSRR boost circuit 150 as a function of the output current Jour in accordance with example embodiments of the present disclosure. Plot 401 illustrates VDD set to an example voltage of 1.8 V. Plot 402 illustrates the voltage at node B of PSRR boost circuit 150, which as shown in FIG. 1, is coupled to the source of NMOS transistor 152. Plot 403 illustrates the bias current $I_{biaspsrr}$ of PSRR boost circuit 150. $I_{biaspsrr}$ may increase proportionally with output current $I_{OUT}$ until the output current $I_{OUT}$ reaches a threshold value, $I_{THOUT}$. Above $I_{THOUT}$, the voltage at node B may be clamped to a maximum value that is equal to VDD minus the gate-to-source voltage of NMOS transistor 152. The bias current $I_{biaspsrr}$ of PSRR boost circuit 150 may likewise be clamped to a constant or near constant value when the output current $I_{OUT}$ is above $I_{THOUT}$.

When the output current $I_{OUT}$ is less than $I_{THOUT}$, the bias current $I_{biaspsrr}$ may be expressed as:

$$I_{biaspsrr}=I_{OUT}/N$$

where N is the ratio of the size of PMOS transistor 124 in second stage 120 to the size of PMOS transistor 153 in PSRR boost circuit 150. When the output current Jour is greater than $I_{THOUT}$, the bias current $I_{biaspsrr}$ may be expressed as:

$$I_{biaspsrr}=(VDD-Vgs_{152})*gm_{151}$$

where $Vgs_{152}$ is the gate-to-source voltage of NMOS transistor 152, and $gm_{151}$ is the transconductance of NMOS transistor 151.

Multiple design parameters may be utilized to set the output current threshold $I_{THOUT}$ at which the bias current $I_{biaspsrr}$ is clamped. For example, the ratio of the size of PMOS transistor 124 in second stage 120 to the size of PMOS transistor 153 in PSRR boost circuit 150 determines the ratio of $I_{biaspsrr}$ to output current $I_{OUT}$. As another example, the VDD voltage applied to the gate of NMOS transistor 152 may be increased or decreased to increase or decrease the voltage level at which node B is clamped, and thus the current level at which bias current $I_{biaspsrr}$ is claimed. Although FIG. 1 illustrates that the gate of NMOS transistor 152 may be coupled to VDD, the gate of NMOS transistor 152 may also be coupled to any other voltage source suitable to set the voltage at which NMOS transistor 152 clamps the bias voltage at node B, and thus the bias current $I_{biaspsrr}$. As further examples, the size of NMOS transistor 152 may be selected to determine the gate-to-source voltage of NMOS transistor 152 at a given current, and the size of NMOS transistor 151 may be selected to determine the transconductance ($gm_{151}$) of NMOS transistor 151.

In some embodiments, PSRR boost circuit 150 may improve the PSRR of regulators such as LDO regulator 100, while also preventing under peaks and over peaks during large transients, such as large steps in the VCC voltage or large changes in the output current $I_{OUT}$ drawn by load 140.

For example, as described above with reference to FIG. 2, PSRR boost circuit 150 may be configured such that diode 161 remains in either a reverse-bias or a zero-bias operating region. Under such operating conditions, diode 161 may function as a varactor or a varactor diode, with a capacitance that may vary as a function of the bias voltage across diode 161.

Figure 5:
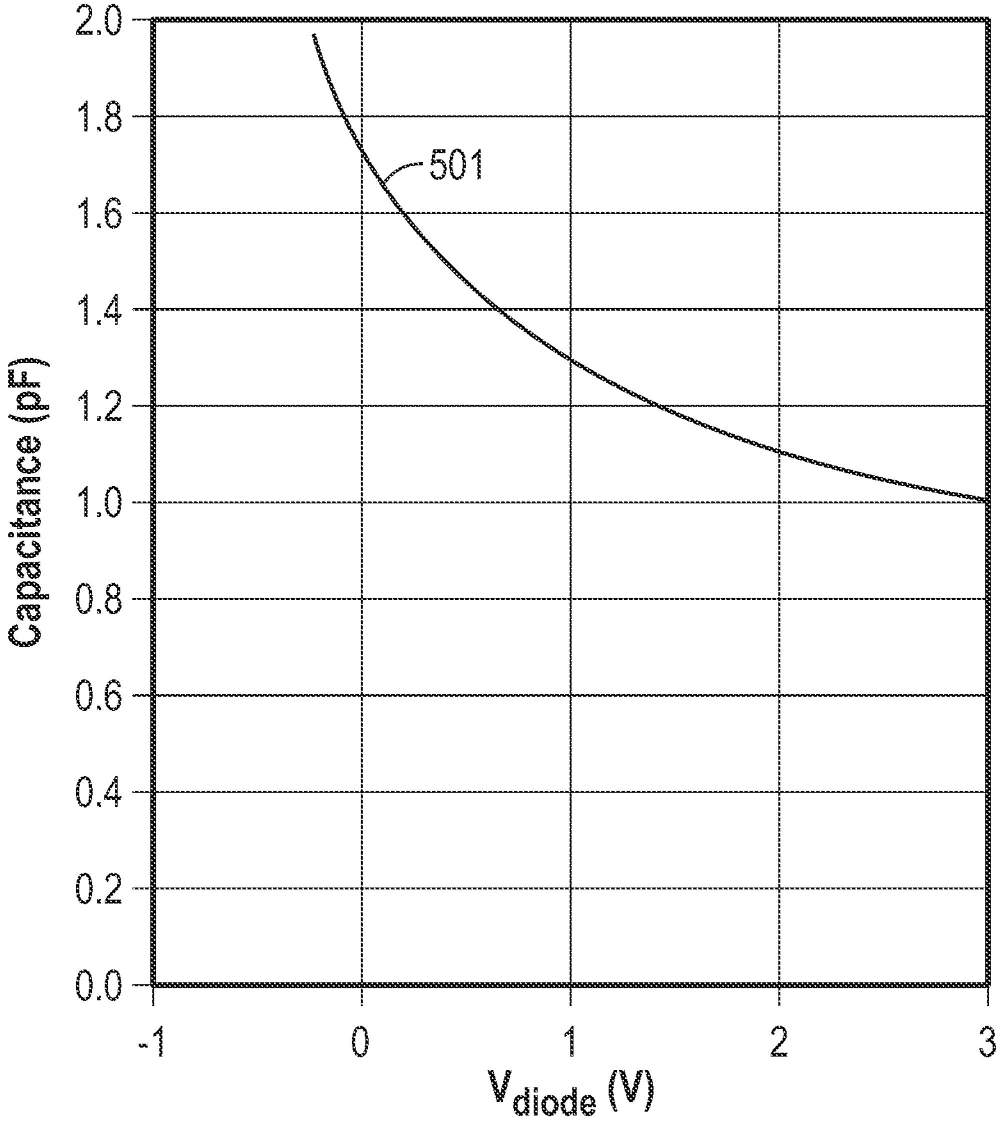
FIG. 5 illustrates a plot diagram of the capacitance of a varactor diode as a function of the bias voltage applied across the varactor diode in accordance with example embodiments of the present disclosure.

FIG. 5 illustrates a plot diagram of the capacitance of a varactor diode, such as diode 161, as a function of the bias voltage applied across the varactor diode in accordance with example embodiments of the present disclosure. Plot 501 illustrates the capacitance of an example embodiment of diode 161 decreasing from, for example, about 1.8 pF to about 1.0 pF as the bias voltage from the cathode to the anode of diode 161 increases from 0 V to 3 V.

Because the capacitance of diode 161 decreases as the bias voltage from the cathode to the anode of diode 161 increases, capacitive element 160 provides a weaker capacitive coupling between node B of PSRR boost circuit 150 and node A of first stage 110 as the bias voltage at node B increases relative to the bias voltage at node A. The amount of compensation provided by PSRR boost circuit 150 in response large transient steps, such as large steps in the VCC voltage provided to LDO regulator 100 or large steps in the output current Jour drawn by load 140, may thus be limited. PSRR boost circuit 150 may accordingly improve the PSRR of LDO regulator 100 without overcompensating when LDO regulator 100 experiences transient steps of, for example, 5 V, 10 V, 20 V, or more, for the VCC voltage. PSRR boost circuit 150 may likewise improve the PSRR of LDO regulator 100 without overcompensating when LDO regulator 100 experiences transient steps of, for example, 10 mA, 100 mA, or more, for the output current Jour drawn by load 140.

Figure 6:
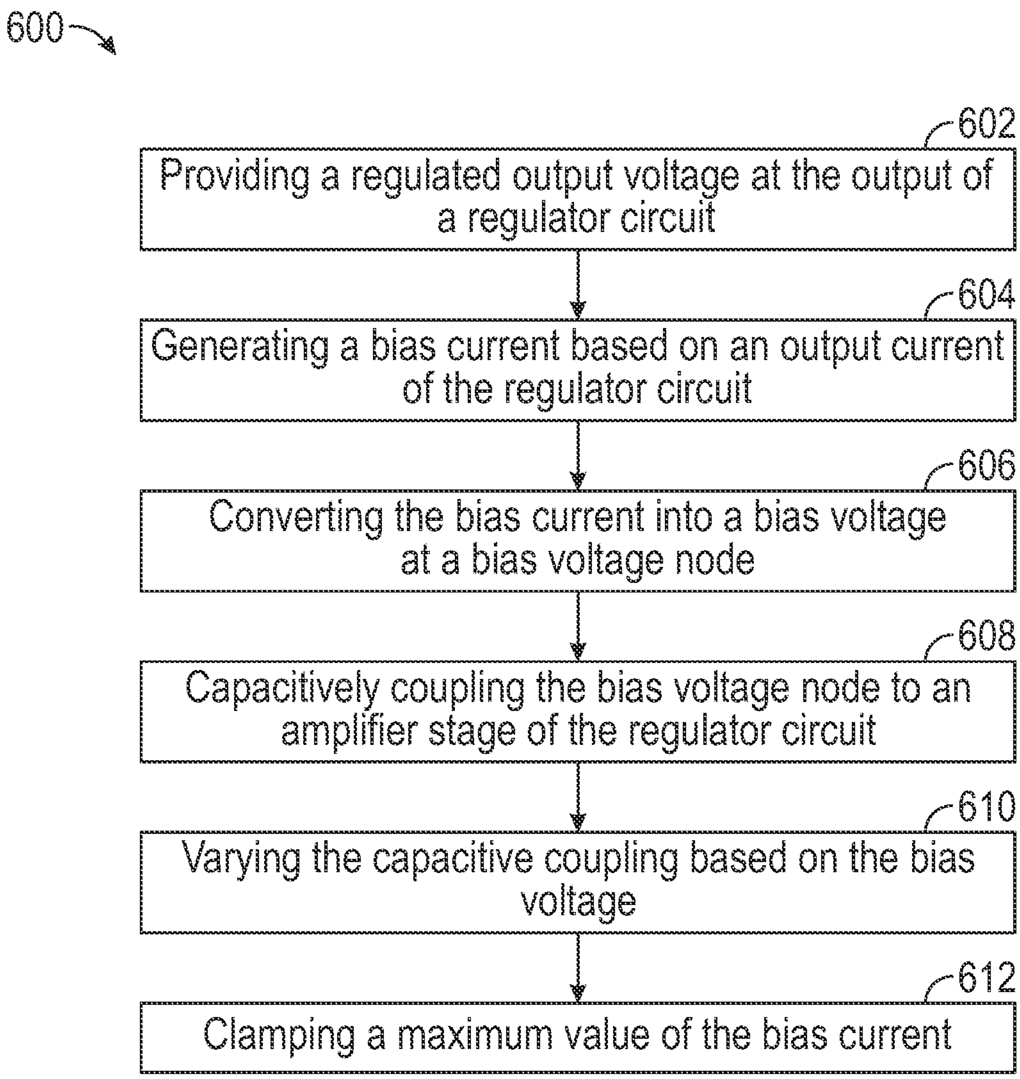
FIG. 6 illustrates a method for enhancing power supply ripple rejection of a regulator circuit in accordance with example embodiments of the present disclosure.

FIG. 6 illustrates operation of an example method 600 for enhancing power supply ripple rejection of a regulator circuit in accordance with example embodiments of the present disclosure. Method 600 may be performed by any suitable mechanism, such as first stage 110, second stage 120, and PSRR boost circuit 150 of LDO regulator 100, or any suitable combination thereof. Method 600 may be performed with fewer or more steps than shown in FIG. 6. Moreover, steps of method 600 may be omitted, repeated, performed in parallel, performed in a different order than shown in FIG. 6, or performed recursively. One or more steps of method 600, although shown in an order, may be performed at the same time or in a re-ordered manner.

At step 602, a regulated output voltage may be provided at the output of a regulator circuit. For example, LDO regulator 100 may provide a regulated output voltage $V_{OUT}$ at output 130.

At step 604, a bias current may be generated based on the output current of the regulator circuit. For example, PSRR boost circuit 150 may include a PMOS transistor 153, which may generate a bias current $I_{biaspsrr}$ that is proportional to the output current $I_{OUT}$. In some embodiments, PMOS transistor 153 may mirror the drive current that passes through PMOS transistor 123 in the same manner that PMOS transistor 124 mirrors the drive current to provide the output current $I_{OUT}$. PMOS transistor 153 may thus also be referred to as mirroring the output current $I_{OUT}$.

At step 606, the bias current may be converted into a bias voltage at a bias voltage node. For example, NMOS transistor 151 of PSRR boost circuit 150 may be configured to receive the bias current $I_{biaspsrr}$. NMOS transistor 151 may be configured as a diode-connected MOSFET with its drain coupled to its gate. NMOS transistor 151 may thereby serve as a current-to-voltage converter that, based on the bias current $I_{biaspsrr}$, generates a bias voltage at a bias voltage node such as node B of PSRR boost circuit 150.

At step 608, the bias voltage node may be capacitively coupled to an amplifier stage of the regulator circuit. For example, as shown in FIG. 1, capacitive element 160 may capacitively couple node B of PSRR boost circuit 150 to node A of first stage 110.

At step 610, the capacitive coupling may be varied based on the bias voltage. For example, as shown in FIG. 2, node A and node B may be biased such that diode 161 of capacitive element 160 is either zero-biased or reverse-biased across a range of output currents $I_{OUT}$. Diode 161 may thus serve as a varactor diode with a capacitance that, as shown in FIG. 5, varies based on the voltage bias applied across diode 161. As output current $I_{OUT}$ varies, the bias voltage at node B may also vary, thus causing the capacitance of diode 161, and the overall capacitance of capacitive element 160, to vary.

At step 612, a maximum value of the bias current may be clamped. For example, PMOS transistor 153 may be configured to mirror PMOS transistor 123 to generate a bias current $I_{biaspsrr}$ in the same manner that PMOS transistor 124 mirrors PMOS transistor 123 to generate the output current $I_{OUT}$. Thus, the bias current $I_{biaspsrr}$ of PSRR boost circuit 150 may be generated based on the output current $I_{OUT}$ of LDO regulator 100. Further, NMOS transistor 152 may be placed in the path of $I_{biaspsrr}$ between PMOS transistor 153 and node B of PSRR boost circuit 150. The gate of NMOS transistor 152 may be coupled to VDD. The voltage at node B may thus be limited to a maximum value of VDD minus the gate-to-source voltage of NMOS transistor 152. Accordingly, the bias current $I_{biaspsrr}$ may increase proportionally with the output current $I_{OUT}$ until the output current Jour reaches a threshold value, $I_{THOUT}$. Above $I_{THOUT}$, the voltage at node B may be clamped to a maximum value equal to VDD minus the gate-to-source voltage of NMOS transistor 152. The bias current $I_{biaspsrr}$ of PSRR boost circuit 150 may thus likewise be clamped to a maximum value when the output current $I_{OUT}$ is above $I_{THOUT}$.

Although examples have been described above, other modifications and variations may be made from this disclosure without departing from the spirit and scope of these examples. The above descriptions of various embodiments illustrate the principles of the invention. Numerous variations and modifications will become apparent to those skilled in the art based on the above disclosure. The following claims are intended to embrace all such variations and modifications.

What is claimed is:

1. A regulator circuit, comprising:

a first stage including a reference input and a feedback input, the feedback input configured to receive feedback from an output of the regulator circuit;

a second stage coupled to the first stage, the second stage including an output transistor configured to drive the output of the regulator circuit; and a boost circuit, comprising:

a first transistor configured to mirror an output current of the output transistor to generate a bias current in response to the output current;

a current-to-voltage converter configured to receive the bias current from the first transistor and to generate a bias voltage at a bias voltage node based on the received bias current; and a capacitive element coupled in series between the bias voltage node of the current-to-voltage converter and a node of the first stage to inject an AC ripple at the bias voltage node into the node of the first stage.

2. The regulator circuit of claim 1, wherein the capacitive element comprises a varactor diode.

3. The regulator circuit of claim 2, wherein the capacitive element further comprises a capacitor coupled in series with the varactor diode.

4. The regulator circuit of claim 1, wherein the boost circuit includes a clamp configured to limit a maximum value of the bias current.

5. The regulator circuit of claim 1, wherein:
- the first stage is configured to be powered by a first voltage supply; and
- the second stage and the boost circuit are configured to be powered by a second voltage supply.

6. The regulator circuit of claim 1, wherein the output transistor of the second stage is coupled to provide an open-drain output to the output of the regulator circuit.

7. The regulator circuit of claim 1, wherein the current-to-voltage converter of the boost circuit comprises a diode-connected transistor.

8. A low-dropout regulator, comprising:
- a first amplifier stage configured to be powered by a first voltage supply, the first amplifier stage comprising:
  - a reference input; and
  - a feedback input configured to receive feedback from an output of the low-dropout regulator;
- a second amplifier stage configured to be powered by a second voltage supply, the second amplifier stage comprising:
  - a second-stage input coupled to a first-stage output; and
  - an output transistor configured to drive the output of the low-dropout regulator; and
- a boost circuit configured to be powered by the second voltage supply, the boost circuit comprising:
  - a first transistor configured to mirror an output current of the output transistor to generate a bias current in response to the output current;
  - a current-to-voltage converter configured to receive the bias current from the first transistor and to generate a bias voltage based on the received bias current; and
  - a capacitive element coupled between the current-to-voltage converter and a node of the first amplifier stage.

9. The low-dropout regulator of claim 8, wherein the capacitive element comprises a varactor diode.

10. The low-dropout regulator of claim 9, wherein the capacitive element further comprises a capacitor coupled in series with the varactor diode.

11. The low-dropout regulator of claim 8, wherein the boost circuit includes a clamp configured to limit a maximum value of the bias current.

12. The low-dropout regulator of claim 8, wherein a second voltage provided by the second voltage supply is equal to or greater than a first voltage provided by the first voltage supply.

13. The low-dropout regulator of claim 8, wherein the output transistor of the second amplifier stage is coupled to provide an open-drain output to the output of the low-dropout regulator.

14. The low-dropout regulator of claim 8, wherein the current-to-voltage converter of the boost circuit comprises a diode-connected transistor.

15. A method for increasing power supply ripple rejection, comprising:
- providing a regulated output voltage at an output of a regulator circuit;
- mirroring an output current of the regulator circuit to generate a bias current in response to the output current;
- receiving the bias current with a current-to-voltage converter and generating a bias voltage at a bias voltage node based on the received bias current;
- capacitively coupling the bias voltage node to an amplifier stage of the regulator circuit to inject an AC ripple at the bias voltage node into a node of the amplifier stage.

16. The method of claim 15, further comprising varying the capacitive coupling based on the bias voltage.

17. The method of claim 15, further comprising clamping the bias current to a maximum value.

18. The method of claim 15, wherein clamping the bias current comprises limiting the bias voltage based at least on a voltage level of a first voltage supply and a gate-to-source voltage of a clamp transistor.

19. The method of claim 15, wherein converting the bias current to the bias voltage at a bias voltage node comprises receiving the bias current at a diode-connected metal-oxide semiconductor field-effect transistor.

* * * * *